United States Patent
Aibe et al.

(10) Patent No.: US 9,034,404 B2
(45) Date of Patent: May 19, 2015

(54) BOTTLED BEVERAGE COMPRISING CAP CONTAINING DIETARY SUPPLEMENT AND BOTTLE FILLED WITH DISPERSION MEDIUM FOR DIETARY SUPPLEMENT

(75) Inventors: Kaori Aibe, Yokohama (JP); Masatoshi Honjo, Yokohama (JP); Tatsuo Nakamura, Yokohama (JP); Sachiko Endou, Yokohama (JP)

(73) Assignee: FANCL CORPORATION, Yokohama-shi (JP)

( * ) Notice: Subject to any disclaimer, the term of this patent is extended or adjusted under 35 U.S.C. 154(b) by 67 days.

(21) Appl. No.: 14/005,465

(22) PCT Filed: Mar. 29, 2012

(86) PCT No.: PCT/JP2012/058384
§ 371 (c)(1),
(2), (4) Date: Sep. 16, 2013

(87) PCT Pub. No.: WO2012/133658
PCT Pub. Date: Oct. 4, 2012

(65) Prior Publication Data
US 2014/0017363 A1    Jan. 16, 2014

(30) Foreign Application Priority Data
Mar. 30, 2011  (JP) ................. 2011-073815

(51) Int. Cl.
*B65D 81/32*  (2006.01)
*B65D 51/28*  (2006.01)
(Continued)

(52) U.S. Cl.
CPC .......... *B65D 51/2828* (2013.01); *A23L 1/0545* (2013.01); *A23L 1/0524* (2013.01);
(Continued)

(58) Field of Classification Search
CPC ........ B65D 25/08; B65D 41/20; B65D 41/26; B65D 51/20; B65D 51/22; B65D 51/221; B65D 51/222; B65D 51/223; B65D 51/28; B65D 1/2807; B65D 51/2814; B65D 51/2835; B65D 51/285; B65D 81/3216; B65D 81/3222; B65D 2217/00; B65D 51/2828; A61J 1/2093; A61K 9/16; A61K 9/28; A61K 9/5073; A61K 9/5078; A61K 9/50; A23L 2/00; A23L 1/03; A23L 1/13; A23L 2/62; A23L 2/52; A23L 1/0545; A23L 1/0524; A23L 1/0029; A23L 1/22016; A23C 9/1544
USPC .......... 215/228, 252, 257, 297; 206/217, 568, 206/219–222; 220/277, 278, 506; 222/81, 222/94; 426/112, 115, 120, 394, 590, 599, 426/72–74, 89, 96, 98–99, 573–579
See application file for complete search history.

(56) References Cited

U.S. PATENT DOCUMENTS 3,793,464 A * 2/1974 Rusch .............................. 426/89
5,162,057 A * 11/1992 Akiyama et al. .............. 106/243
(Continued)

FOREIGN PATENT DOCUMENTS

CN     200964238 Y    10/2007
EP      0443572 A1     8/1991
(Continued)

OTHER PUBLICATIONS

Machine translation of JP 10179103.*
(Continued)

*Primary Examiner* — Drew Becker
*Assistant Examiner* — Luana Z Long
(74) *Attorney, Agent, or Firm* — Law Offices of Katsuhiro Arai

(57) ABSTRACT

A bottled drink includes a cap and a bottle where a granular supplement containing multiple constituents in a stable manner is stored in the cap and a solution suitable for dispersing the granules is filled in the bottle. Granules which contains mutually incompatible multiple chemical agents or nutritional constituents and whose surface is coated with polyglyceryl fatty acid ester are stored in the cap of the bottle and the bottle is filled with a solution whose viscosity at a shear deformation speed of 0.01 $s^{-1}$ is 10 to 300 Pa·s.

14 Claims, 6 Drawing Sheets

(51) Int. Cl.
*A23L 1/054* (2006.01)
*A23L 1/0524* (2006.01)
*A23L 1/00* (2006.01)
*A23L 2/52* (2006.01)

(52) U.S. Cl.
CPC .......... *B65D51/2835* (2013.01); *A23L 1/0032* (2013.01); *B65D 51/285* (2013.01); *B65D 81/3222* (2013.01); *A23L 2/52* (2013.01)

(56) References Cited

U.S. PATENT DOCUMENTS

| | | | | |
|---|---|---|---|---|
| 5,597,604 | A | * | 1/1997 | Chalupa et al. ............... 426/590 |
| 5,869,118 | A | * | 2/1999 | Morris et al. ................... 426/72 |
| 6,106,883 | A | * | 8/2000 | Sokolik et al. ................ 426/573 |
| 6,705,462 | B2 | * | 3/2004 | Kasuya .......................... 206/222 |
| 7,279,187 | B2 | * | 10/2007 | Daniels et al. .................. 426/74 |
| 7,378,122 | B2 | * | 5/2008 | Bernardini et al. ........... 426/573 |
| 7,475,774 | B2 | * | 1/2009 | Clarkson ....................... 206/222 |
| 2002/0096440 | A1 | * | 7/2002 | Kasuya .......................... 206/222 |
| 2002/0187221 | A1 | * | 12/2002 | Tanaka et al. ................... 426/89 |
| 2007/0141204 | A1 | * | 6/2007 | Xiong et al. .................... 426/74 |
| 2008/0008814 | A1 | * | 1/2008 | Jackson et al. ................ 426/590 |
| 2008/0093326 | A1 | * | 4/2008 | Cho ............................... 215/228 |
| 2008/0299199 | A1 | * | 12/2008 | Bar-Shalom et al. ......... 424/484 |
| 2009/0135666 | A1 | | 5/2009 | Watano et al. |
| 2012/0107468 | A1 | * | 5/2012 | Doyle et al. ................... 426/271 |

FOREIGN PATENT DOCUMENTS

| | | | | | |
|---|---|---|---|---|---|
| JP | 05003773 | A | * | 1/1993 | ................ A23L 2/00 |
| JP | H05-310599 | A | | 11/1993 | |
| JP | 10179103 | A | * | 7/1998 | ................ A23L 2/62 |
| JP | 2000-016931 | A | | 1/2000 | |
| JP | 2000016931 | A | * | 1/2000 | ................ A61K 9/16 |
| JP | 2001-019639 | A | | 1/2001 | |
| JP | 2004-065016 | A | | 3/2004 | |
| JP | 2005-060276 | A | | 3/2005 | |
| JP | 2005060276 | A | * | 3/2005 | ................ A61K 9/16 |
| JP | 2007022928 | A | * | 2/2007 | ............ A61K 47/02 |
| JP | 2008-529755 | A | | 8/2008 | |
| JP | 2009-519869 | A | | 5/2009 | |
| JP | 2009-261393 | A | | 11/2009 | |
| WO | 2006/085677 | A1 | | 8/2006 | |

OTHER PUBLICATIONS

Machine translation of JP 2000016931.*
Machine translation of JP 2005060276.*
JP 05003773 A Machine Translation: Accessed Jul. 19, 2014 from AIPN.*
International Search Report (ISR) mailed Jun. 12, 2012, issued for International application No. PCT/JP2012/058384.
Notification of Transmittal of Translation of the International Preliminary Report on Patentability (PCT/IB/338) mailed Oct. 17, 2013, with International Preliminary Report on Patentability (PCT/IB/373) and Written Opinion of the International Searching Authority (PCT/ISA/237), for corresponding international application PCT/JP2012/058384.
A Notification of First Office Action issued by the State Intellectual Property Office of China, mailed Jan. 20, 2014, for Chinese counterpart application No. 201280012116.6.

* cited by examiner

Immediately after mixing 5 minutes later 10 minutes later 15 minutes later

After removal

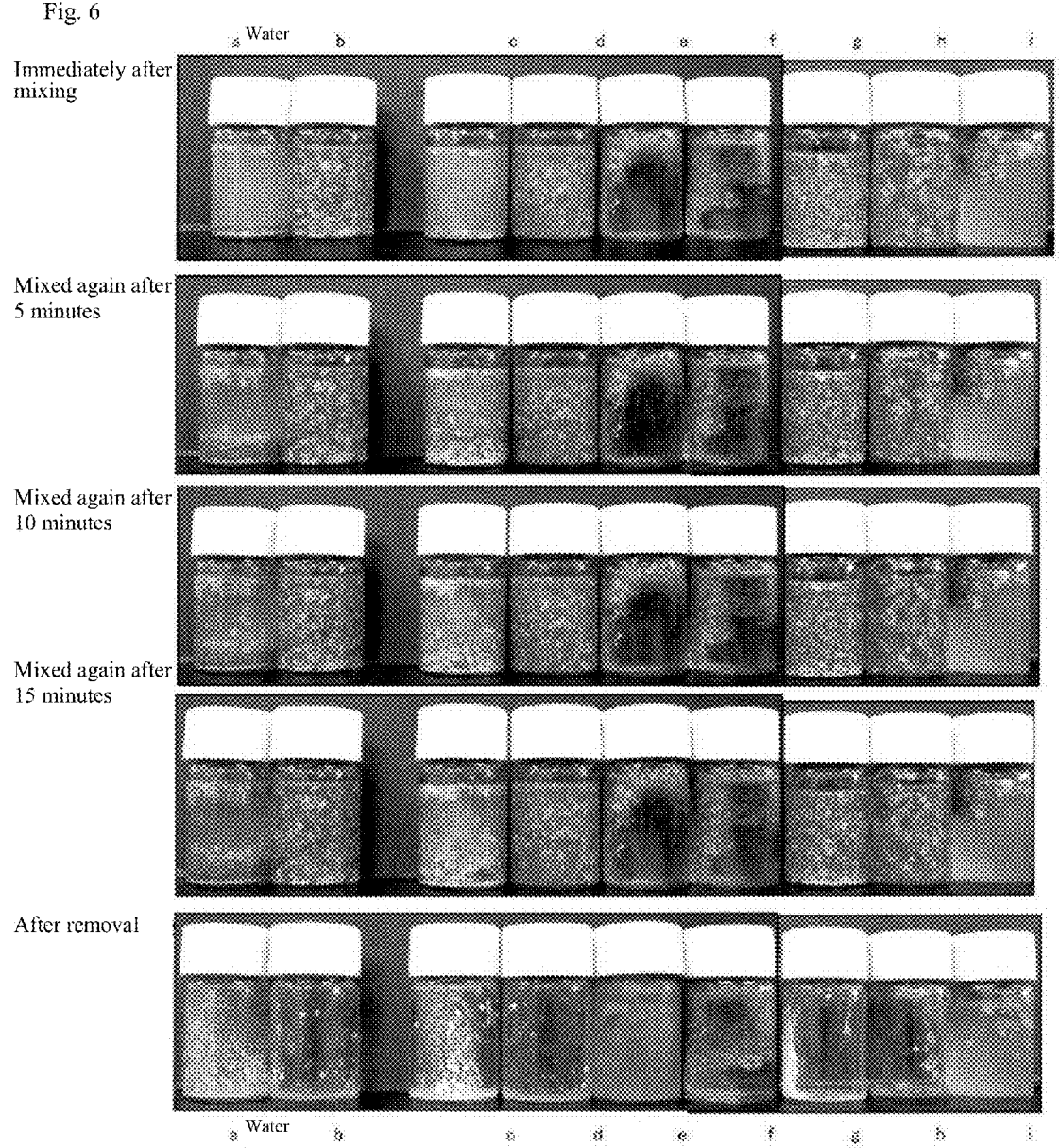

BOTTLED BEVERAGE COMPRISING CAP CONTAINING DIETARY SUPPLEMENT AND BOTTLE FILLED WITH DISPERSION MEDIUM FOR DIETARY SUPPLEMENT

This application is the U.S. National Phase under 35 U.S.C. §371 of International Application PCT/JP2012/058384, filed Mar. 29, 2012, which claims priority to Japanese Patent Application No. 2011-073815, filed Mar. 30, 2011. The International Application was published under PCT Article 21(2) in a language other than English.

TECHNICAL FIELD

The present invention relates to a bottled drink comprising a granular supplement and a bottle filled with a dispersion medium for the supplement.

PRIOR ART

Nutritional supplements have drawn considerable attention and are widely used. General forms of supplements include tablets, soft capsules, hard capsules, etc. Appropriate forms vary depending on the properties of the supplement such as solubility in water and solubility in oil, as well as the nature of the supplement such as whether or not it gives off smell, and traditionally each supplement is made of constituents that have been compounded according to a specified formula. Many people use multiple types of supplements. Also, quantities of an existing formula need not be followed, as there is a need to change/accommodate the formula to suit different individuals by changing the ratios of constituents according to each user. In the case of a dry powder formula divided into portions and wrapped in paper, the powder may not disperse in water or it may stick to a cup, etc.

A number of ideas have been attempted to make an insoluble chemical agent soluble. For example, Patent Literature 1, which relates to magnesium, calcium and other minerals, describes that, while $MgCl_2$ (magnesium chloride), $MgSO_4$ (magnesium sulfate) and other Mg salts as well as $CaCl_2$ (calcium chloride) and other Ca salts dissolve easily in water but present a problem of being very bitter, magnesium hydroxide and calcium carbonate, having low solubility in water, can be dissolved in a dispersion medium consisting of water, citric acid, and glycine to provide a mineral-containing solution which remains bitterness-free and stable for one month or longer.

A number of drug preparation ideas have also been tried to allow for simultaneous intake of multiple active constituents, but it has also been pointed out that cross-reactions of multiple constituents might cause browning, solidification, or so-called chemical incompatibility problems. One way to manufacture granules containing incompatible chemical agents or nutritional constituents is to manufacture two or more types of granules each containing an incompatible chemical agent and then mixing the granules, in order to prevent compounding changes (incompatibility). Another practice is to coat the granule surface with an additive agent in order to prevent compounding changes caused by granules contacting each other and suppress bitterness of the chemical agent itself (granules before being coated with an additive agent may be hereinafter referred to as "original granules" in this Specification, while granules made by mixing two or more types of incompatible chemical agents or nutritional constituents may be hereinafter referred to as "mixed granules"). When manufacturing mixed granules coated with an additive agent, individual original granules, traditionally, were coated with the additive agent and then the coated granules were mixed, in order to prevent compounding changes.

Patent Literature 2 discloses a method to manufacture mixed granules containing isopropyl antipyrine (IPA) and acetaminophene being a chemical agent incompatible with IPA. In Patent Literature 2, original granules made by compounding IPA with a masking agent are mixed with original granules in which acetaminophene is compounded, to prepare mixed granules.

In addition, Patent Literature 3 discloses a method of preparing original granules separately and then coating them in a mixed fluidized bed.

In other words, as described in the aforementioned patent literatures, the traditional idea was that denaturing of incompatible chemical agents can be suppressed by coating the surface of original granules with an additive agent. However, it is already known that this alone cannot achieve the purpose of suppressing compounding changes. The greatest reason lies in the moisture content coming from the materials used to prepare original granules, or moisture content originating from the granulation process. Accordingly, a standard method now is to prepare original granules by mixing, kneading and granulation and then drying the original granules in a machine to reduce the moisture content to approx. 5% before coating. By isolating the chemical agents through coating to prevent contact, cross-reactions of chemical agents or nutritional constituents has been suppressed.

Further, no bottled drink has been available which makes it easy to drink these granules.

PRIOR ART LITERATURES

Patent Literatures

Patent Literature 1: Japanese Patent Laid-open No. 2004-65016

Patent Literature 2: Japanese Patent Laid-open No. 2001-19639

Patent Literature 3: Japanese Patent Laid-open No. 2005-60276

Patent Literature 4: Published Japanese Translation of PCT International Patent Application No. 2008-529755

SUMMARY OF THE INVENTION

Problems to Be Solved by the Invention

An object of the present invention is to provide a novel bottled drink where a granular supplement containing multiple constituents in a stable manner is stored in the cap, and a solution suitable for dispersing the granules is filled in the bottle. It is also an object of the present invention to provide a drink that does not taste odd (strange taste), bitter, or unpleasant when the granules are dispersed in the solution.

Means for Solving the Problems

The present invention covers the following constitutions:
(1) A bottled drink characterized in that granules whose surface is coated with polyglyceryl fatty acid ester are stored in a cap of a bottle and the bottle is filled with a solution whose viscosity at a shear deformation speed of $0.01\ s^{-1}$ is 10 to 300 Pa·s, wherein the granules are to be mixed with the solution before drinking and then offered as a drink.
(2) A bottled drink characterized in that granules containing mutually incompatible chemical agents or nutritional constituents and whose surface is coated with polyglyceryl fatty acid ester are stored in a cap of a bottle and the bottle is filled with a solution whose viscosity at a shear deformation speed of 0.01 s$^{-1}$ is 10 to 300 Pa·s, wherein the granules are to be mixed with the solution before drinking and then offered as a drink.

(3) A bottled drink according to (1) or (2), characterized in that the solution is an aqueous solution containing gellan gum.

(4) A bottled drink according to (1) or (2), characterized in that the solution is an aqueous solution containing psyllium seed gum and/or pectin and gellan gum.

(5) A bottled drink according to any one of (1) through (4), characterized in that the moisture content of granules is 2% by mass or less.

Effects of the Invention

Even though multiple constituents are contained, the granules have high storage stability, and since the granular supplement is housed in the cap, it is easy to drink. Additionally, since the granules can be uniformly dispersed in the solution and little remains in the container when the container is tilted to pour out the granules, the necessary amount of granules can be taken with ease. Furthermore, granules constituting a supplement whose storage property drops in a solution state or a supplement formulated for each individual, etc., can be mixed in the dispersion medium proposed by the present invention immediately before drinking.

Moreover, a drink conforming to the present invention allows the supplement constituents to remain stable for a long time, unlike when the supplement constituents are dissolved and dispersed in the solution beforehand.

Additionally, the solution in which the granules are dispersed does not taste odd or unpleasant when it is drunk, because the supplement is not dissolved.

BRIEF DESCRIPTION OF THE DRAWINGS

FIG. 6 is a drawing showing the result of the second test in which the mixed state of granules and drink is observed.

MODE FOR CARRYING OUT THE INVENTION

Figure 1:
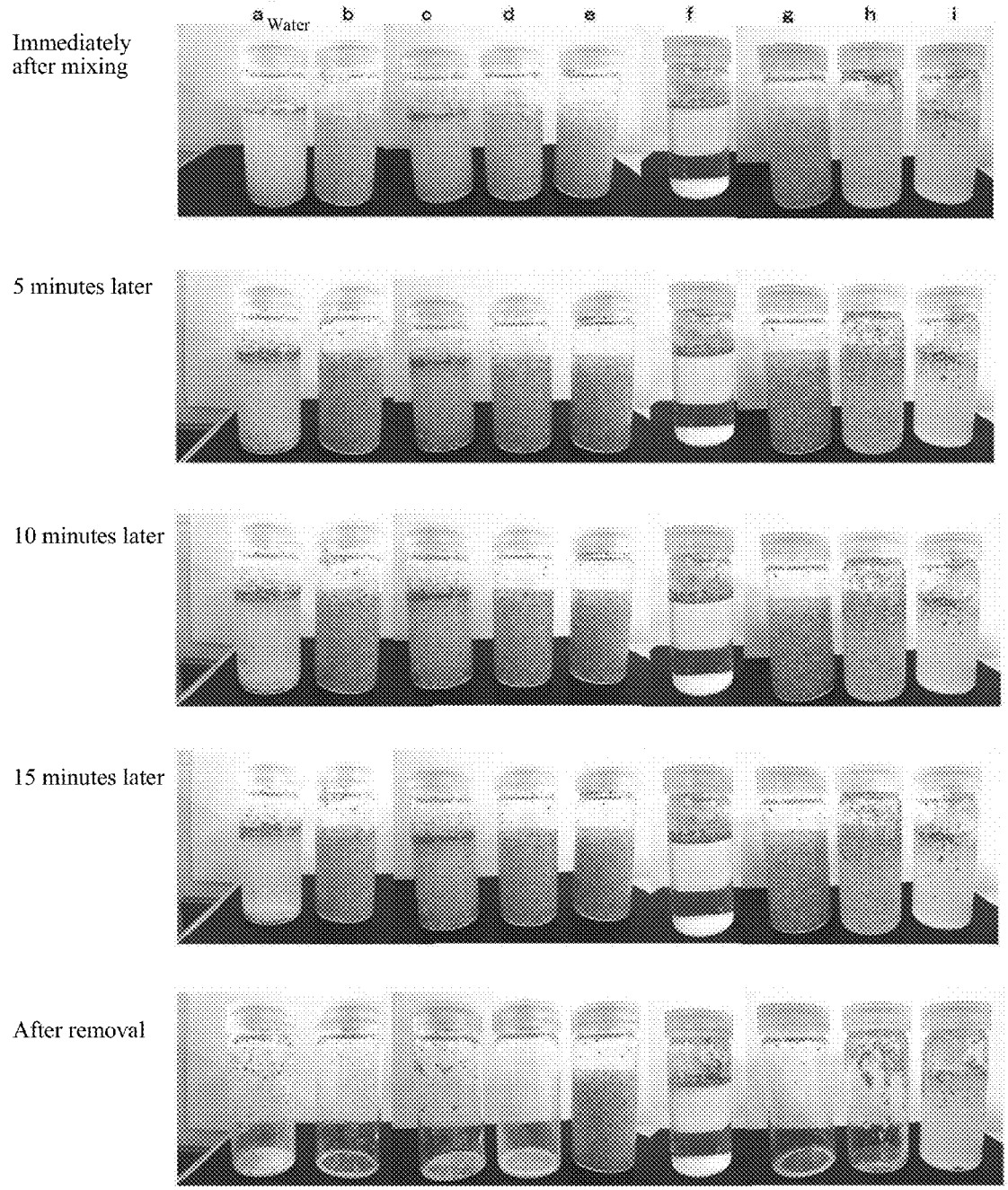
FIG. 1 is an observation drawing of a granular supplement in a state dispersed in a drink.

Two or more types of incompatible chemical agents or nutritional constituents can be used as the chemical agents or nutritional constituents for the granules proposed by the present invention. Examples of combinations of incompatible chemical agents or nutritional constituents include: γ aminobutyric acid and vitamin C, Korean ginseng and seamless encapsulating agent containing eicosapentaenoic acid, seamless encapsulating agent containing eicosapentaenoic acid and vitamin C, Korean ginseng and seamless encapsulating agent having gelatin film, vitamin C and seamless encapsulating agent having gelatin film, and/or metal salt and seamless encapsulating agent containing eicosapentaenoic acid, among others. It should be noted that granules conforming to the present invention can also contain various chemical agents and nutritional constituents of any type whatsoever.

Original granules can contain diluent, binder, disintegrant, and other additives permitted in the field of drug formulation, in addition to chemical agents and nutritional constituents. As for diluent, a wide range of diluents known in the applicable field can be used, such as lactose, white sugar, glucose, D-mannitol, powder reduced maltose syrup, maltitol, xylitol, erythritol, D-sorbitol, maltose, starch, starch derivative, aspartame, glycyrrhizic acid and salt thereof, saccharine and salt thereof, stevia and salt thereof, sucralose, acesulfame potassium, and calcium hydrogen phosphate, of which lactose, white sugar, D-mannitol, and starch are preferred. One type of diluent may be selected or two or more types of diluents may be combined and used as such.

As for binder, a wide range of binders known in the applicable field can be used, such as hydroxypropyl cellulose, hydroxypropyl methyl cellulose, polyvinyl pyrrolidone, methyl cellulose, dextrin, starch and starch derivative, guar gum, gum Arabic, tragacanth, alginic acid and salt thereof, pullulan, carrageenan, gelatin, agar, carboxy vinyl polymer, and sodium carmellose, of which hydroxypropyl cellulose, hydroxypropyl methyl cellulose, polyvinyl pyrrolidone, and methyl cellulose are preferred. One type of binder may be selected or two or more types of binders may be combined and used as such.

As for disintegrant, a wide range of disintegrants known in the applicable field can be used, such as carboxy methyl sodium starch, sodium carmellose, and low-substitution hydroxypropyl cellulose. One type of disintegrant may be selected or two or more types of disintegrants may be combined and used as such.

Under the present invention, original granules containing mutually incompatible chemical agents or nutritional constituents, and preferably the aforementioned additive agents, etc., are manufactured separately. Original granules containing respective chemical agents or nutritional constituents can be manufactured separately using the same granulation method or similar granulation methods.

Manufacturing methods for original granules are not specifically limited and a wide range of methods known in the applicable field can be used, where specific examples include the extrusion granulation method, rolling granulation method, agitation granulation method, fluidized-bed granulation method, rolling fluidized granulation method, and kneading granulation method. Among those, the kneading granulation method is preferred.

For the granulation machine used for kneading granulation, use of a granulation machine equipped with kneading blades and crushing blades is preferred. One example of such granulation machine is a three-axis kneading granulation machine provided by Shinagawa Machinery Works. This machine is disclosed in the laid-open patent document of Patent Literature 4, and the manufacturing method under the present invention can be implemented based on the method described in this laid-open patent document. Under the present invention, it is preferable to manufacture granules according to the granulation method using a three-axis kneading machine because doing so not only allows the respective granules to be made at desired ratios and simplifies the manufacturing process, but it also permits preparation of granules containing the respective granule constituents uniformly.

It should be noted that, under the present invention, two or more types of original granules each containing a different chemical agent or nutritional constituent may be manufactured separately, using the same granulation method or similar granulation methods, where each granule may contain other non-incompatible chemical agent or nutritional constituent as long as granules containing incompatible chemical agents or nutritional constituents are made separately.

The bulk density (bulk specific gravity) of manufactured original granules is not specifically limited, but it should be preferably in a range of 0.35 to 0.75 g/mL, or more preferably in a range of 0.40 to 0.65 g/mL, or most preferably in a range of 0.5 to 0.63 g/mL. If the bulk density is smaller than 0.35 g/mL, high bulk may increase the individually wrapped quantity. If the bulk density exceeds 0.75 g/mL, on the other hand, low bulk results in heavy granules and less individually wrapped quantity. Given the properties of material powders other than mineral materials having high specific gravity, however, it is relatively difficult to prepare material granules of 0.75 g/mL or more in bulk density. Because of this situation, adding granules of high bulk density may increase the bulk density differences among various granules and cause segregation, making it difficult to assure mixing uniformity of one-component granules.

The 50% granule size of original granules is not specifically limited, but it is preferably in a range of 400 to 700 µm, or more preferably in a range of 450 to 650 µm, or most preferably in a range of 500 to 600 µm. If the 50% granule size is greater than 700 µm, the supplement becomes difficult to drink; if the 50% granule size is smaller than 400 µm, on the other hand, granules may agglutinate during coating.

Next, the obtained original granules are dried to remove moisture content. Preferably original granules are dried until the moisture content becomes 2% or less. The drying method is not specifically limited and any drying method can be used as long as it is used for normal granule drying, but the vacuum drying method and air-blow drying method are preferred. Either the vacuum drying method or air-blow drying method may be implemented independently or both may be combined together. However, the vacuum drying method is preferred because it can remove as much moisture content as possible from the granules. It should be noted that, if the moisture content exceeds 2%, various compounding changes may occur such as accelerated breakdown of granules containing incompatible chemical agents or nutritional constituents, drop in melting points of chemical agents, discoloration of the drug, and generation of foul smell.

Next, the surface of each dried original granule is coated with a coating agent. For the coating agent, polyglyceryl fatty acid ester, shellac, zein, sucrose ester, etc., can be used. In this example, polyglyceryl fatty acid ester is used. It should be noted that coating not only suppresses compounding changes occurring in the granules containing incompatible chemical agents or nutritional constituents, but it also provides the effect of suppressing the elution to the drink of the flavors of chemical agents contained in the granules. The quantity of polyglyceryl fatty acid ester used for coating is preferably 1 to 1000 parts by mass, or more preferably 10 to 100 parts by mass, or most preferably approx. 20 parts by mass when suppression of weight increase and coating effect are both considered, relative to 100 parts by mass of original granules.

A preferred method to coat polyglyceryl fatty acid ester on original granules is to use the three-axis kneading granulation machine by Shinagawa Machinery Works mentioned above. In this case, the machine used for preparing the original granules can be used continuously for coating. In other words, coating can be performed by adding the required quantity of polyglyceryl fatty acid ester for coating to the machine that has been used for preparing the original granules. When it comes to coating, preferably the temperature in the container is adjusted to near the melting point of the coating agent, or specifically to approx. 55° C. near the melting point of polyglyceryl fatty acid ester.

The bulk density of granules coated with polyglyceryl fatty acid ester is preferably in a range of 0.55 to 0.75 g/mL, while the 50% granule size is preferably in a range of 450 to 650 µm. Also, the standard deviation of the content of chemical agents or nutritional constituents in the granules is preferably within 5%, or more preferably within 4%, or most preferably within 3%.

Thus-obtained granules can be mixed to prepare complex granules, but if the moisture content of coated granules becomes 2% or more as mentioned above, the granules into which incompatible chemical agents or nutritional constituents have been mixed may quickly undergo cross-reactions and turn brown or solidify. Accordingly, it is preferable to dry the granules again after coating. How the granules should be dried is not specifically limited, but vacuum drying is preferred. If a vacuum dryer is used, preferably drying is performed for 2 to 8 hours until the moisture content drops to 2% or less.

Next, the granules are, directly or as complex granules consisting of mixed granules, stored and sealed in the cap of the container to manufacture the granules conforming to the present invention. How mixing should be performed is not specifically limited, and any normally used mixer can be used. Use of a V-shaped rotary mixer is preferred because it can prepare uniform complex granules efficiently.

Granules conforming to the present invention will not change, undergo little change in their appearance, and will not give off foul smell after a period of storage. Specifically, they should not undergo compounding changes or change their appearance after being stored for 2 months or more, or preferably 4 months or more, or more preferably 6 months or more, at 40° C. and relative humidity of 75% or more.

<Dispersion Medium>

The dispersion medium (solution) used under the present invention is a solution whose viscosity at a shear deformation speed of 0.01 $s^{-1}$ is 10 to 300 Pa·s. This solution can be prepared as (1) aqueous solution containing 0.017% by weight of gellan gum and 0.45% by weight of psyllium seed gum, (2) aqueous solution containing 0.025% by weight of gellan gum, or (3) aqueous solution containing 0.04% by weight of gellan gum and 0.0048% by weight of pectin.

A solution whose Zeroshia viscosity in a range of very low shear speeds where the solution behaves like a Newton fluid is 45 to 1500 Pa·s and whose viscosity at a shear speed of 0.01 $s^{-1}$ is 10 to 300 Pa·s, is suitable.

Gelling agents/stabilizers that realize a dispersion medium of these viscosities include gellan gum, pectin, psyllium seed gum, xanthan gum, locust bean gum, carrageenan, gum Arabic, gelatin, starch, dextrin, cellulose, sodium casein, glycerin, erythritol, and other sugar alcohols, among others.

<Form>

A combination of the aforementioned dispersion medium stored in a container, and granules, can be provided.

The dispersion medium filled in a PET bottle or other container, and granular supplement stored in its cap, are provided as a set and the granular supplement is mixed with the dispersion medium for drinking. The granular supplement can be individually wrapped and stored in a cap with a small storage section. The dispersion medium such as gelling agent is heated, agitated, dissolved, etc., and filled in the container in a solution state.

For example, any known bottle, etc., with a cap having a storage section can be used. Granules are stored in the storage section of the cap, and a dispersion medium conforming to the present invention is stored in the bottle container, and the granules in the cap can be mixed with the dispersion medium immediately before the supplement is taken in the form of drinking.

Figure 4:
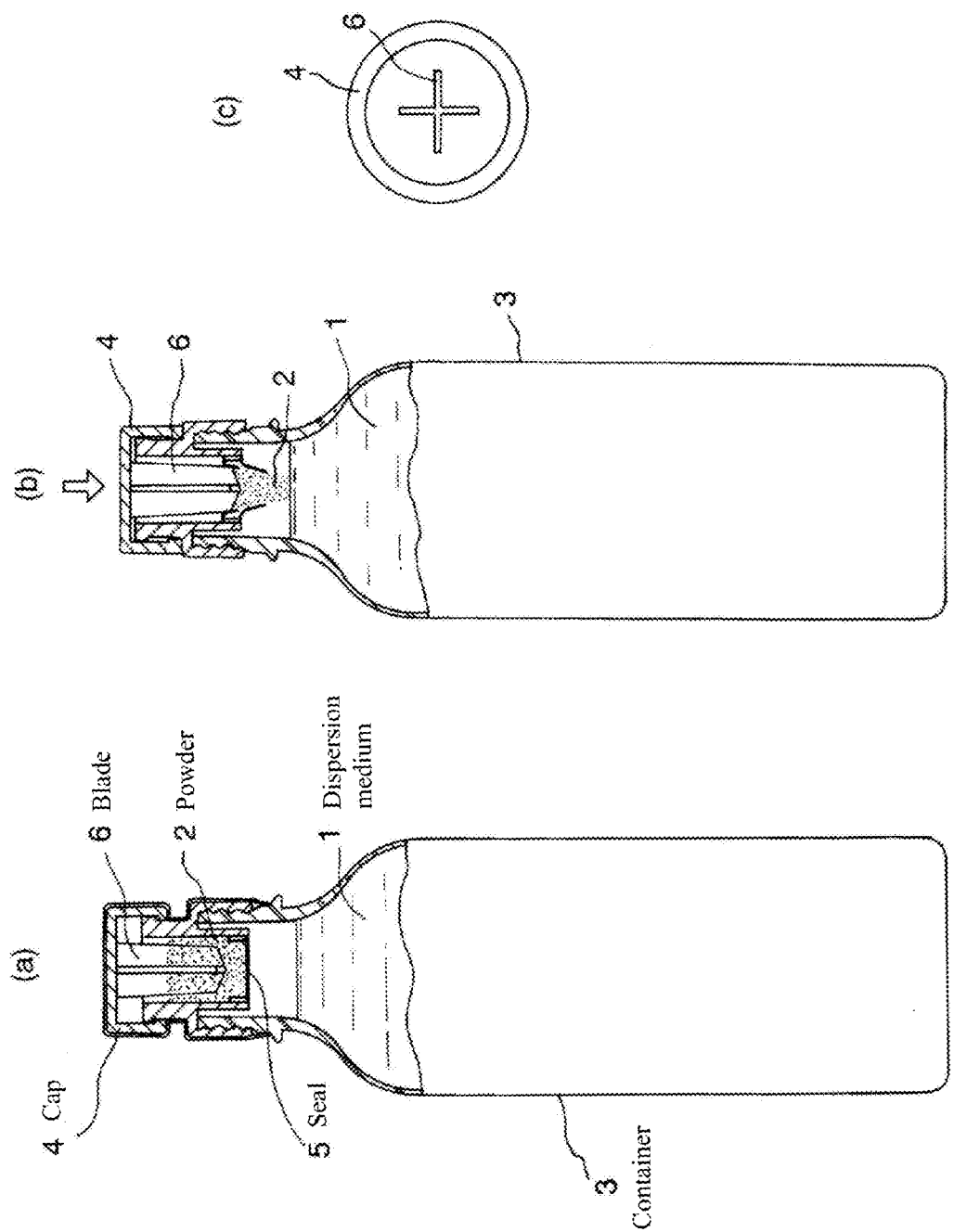
FIG. 4 is an example of a container.

FIG. 4 shows an example of a drink container that allows a granular supplement to be stored in a cap and dispersion medium to be filled/stored in the container, so that the granules can be mixed with the dispersion medium when the supplement is taken. (a) shows a container 3 in which a dispersion medium 1 is stored and a cap 4 with a small storage section filled with granules 2. (b) shows how pushing in the cap 4 causes a tip of a blade 6 provided in the cap to pierce through a seal 5 to let the granules 2 mix with the dispersion medium 1. (c) shows a cross-section view of a middle part of the cap 4, where, in this example, the blade 6 has a crosshair shape, sufficient space is provided for storing powder, and special design is incorporated to increase the size of the opening of the seal 5.

Figure 5:
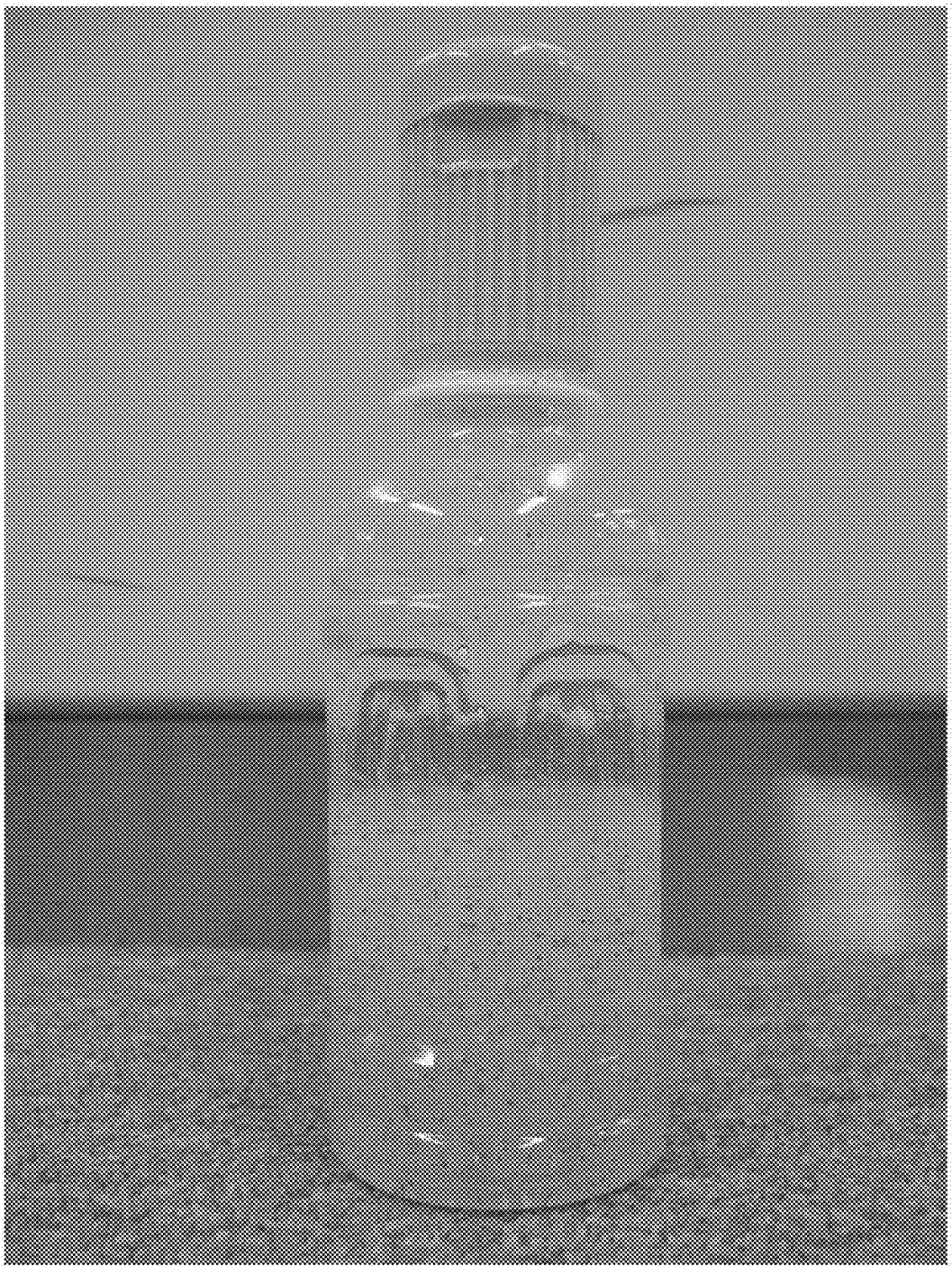
FIG. 5 is a drawing showing a drink conforming to the present invention, being in a state of mixture of granules and dispersion medium.

FIG. 5 shows an example of the bottle container in which the granules and dispersion medium are mixed.

TEXT EXAMPLE 1

The following describes how a drink combining granules and dispersion medium is prepared, along with a test example, to explain the present invention in greater detail.

<Preparation of Dispersion Medium>

1. Compounding of Dispersion Medium

Gellan gum, pectin, psyllium seed gum, dextrin, pH adjuster, gelling aid, and water were compounded to prepare materials, which were then heated and agitated to prepare nine types of dispersion mediums. The specifics of compounding are shown in Table 1.

TABLE 1

| | Name of gelling agent | Concentration |
|---|---|---|
| A | Water | |
| B | San-Support ® G-1014 | 0.50% |
| C | Kelcogel ® | 0.01% |
| D | Kelcogel ® | 0.025% |
| E | Kelcogel ® | 0.050% |
| F | Kelcogel ® | 0.075% |
| G | VIS Top ® D-1796 (D) | 0.10% |
| H | VIS Top ® D-1796 (D) | 0.25% |
| I | VIS Top ® D-1796 (D) | 0.50% |
| Gelling agent | Note 1) San-Support ® G-1014: Gellan gum 3.3%, trisodium citrate 0.8%, dextrin 5.9%, psyllium seed gum 90% (manufactured by San-Ei Gen F.F.I.) Note 2) Kelcogel ®: Gellan gum 100% (manufactured by San-Ei Gen F.F.I.) Note 3) VIS Top ® D-1796 (D): Gellan gum 40.0%, pectin 4.8%, dextrin 55.2% (manufactured by San-Ei Gen F.F.I.) | |

2. Preparation of Dispersion Medium (1) Dispersion medium (b) was prepared by weighing 0.50 g of gelling agent and dissolving it in approx. 80 g of 80° C. hot water for 10 minutes under agitation, and then adding 0.05% calcium lactate as gelling aid and adjusting the weight to 100 g.

(2) Dispersion mediums (c) to (f) were prepared by weighing 0.010 g (c), 0.025 g (d), 0.050 g (e), and 0.075 g (f) of gelling agent, respectively, and dissolving each in approx. 80 g of 90° C. hot water for 10 minutes under agitation, and then adding 0.05% calcium lactate as gelling aid and adjusting the weight to 100 g.

(3) Dispersion mediums (g) to (i) were prepared by weighing 0.10 g (g), 0.25 g (h), and 0.50 g (i) of gelling agent, respectively, and dissolving each in approx. 80 g of 80° C. hot water for 10 minutes under agitation, and then adding 0.05% calcium lactate as gelling aid and adjusting the weight to 100 g.

<Preparation of Granular Supplement>

A. Manufacturing of Original Granules

1) Original Granules Containing Korean Ginseng Extract 0.07 kg of ethanol was added to 0.8 kg of Korean ginseng dry extract and the two were mixed and granulated using a three-axis kneading granulation machine (Triple Master TMGV-5 manufactured by Shinagawa Machinery Works).

Next, 0.012 kg of purified water was added to 0.1499 kg of crystal cellulose (Ceolus UF-F702 manufactured by Asahi Kasei Chemicals) prepared earlier, and the two were again mixed using a three-axis kneading granulation machine (Triple Master TMGV-5 manufactured by Shinagawa Machinery Works), after which 0.081 kg of the mixture was added and granulated, followed by primary drying at 50° C. Next, the granules were crushed and taken out of the aforementioned machine and then dried at 50° C. for 12 hours using an air-blow dryer to reduce the moisture content of granules to 2% or less. The dried granules were passed through a JIS 16-mesh sieve to arrange the granule size and 1 kg of original granules was obtained.

2) Original Granules Containing γ Aminobutyric Acid (GABA)

0.1 kg of ethanol was added to 0.8 kg of GABA extract (manufactured by Oryza Oil & Fat Chemical) and 0.2 kg of crystal cellulose (Ceolus FD-F20 manufactured by Asahi Kasei Chemicals) and primary granulation was performed using the aforementioned Triple Master TMGV-5. Next, 100 g of 50% ethanol was added and secondary granulation was performed, after which 0.05 kg of water was added and tertiary granulation was performed, followed by primary drying. Thereafter, the original granules were taken out of the machine and dried at 50° C. for 12 hours using an air-blow low-temperature dryer to reduce the moisture content of granules to 2% or less. After drying, the granules were sifted through a 16 mesh sieve in the same manner as mentioned above to arrange the granule size and 1 kg of original granules was obtained.

3) Original Granules Containing Vitamin C 0.7639 kg of vitamin C (manufactured by BASF) and 0.0316 kg of water-soluble cellulose powder (Metrose SE-60 manufactured by Shin-Etsu Chemical) were mixed using the aforementioned Triple Master TMGV-5, after which a granulating solution prepared by dissolving 0.0045 kg of the aforementioned water-soluble cellulose in 0.0405 kg of purified water was used to perform kneading granulation. After the granulation, the original granules were dried at 50° C. for 12 hours using an air-blow dryer to reduce the moisture content to 2% or less, and 0.8 kg of original granules was obtained.

4) Original Granules Containing Vitamin B 0.1 kg of ethanol was added to 0.8 kg of VB mix (manufactured by NOF) and 0.2 kg of crystal cellulose (Ceolus FD-F20 manufactured by Asahi Kasei Chemicals) and primary granulation was performed using the aforementioned Triple Master TMGV-5, followed by primary drying. Thereafter, the original granules were taken out of the machine and dried at 50° C. for 12 hours using an air-blow low-temperature dryer to reduce the moisture content of granules to 2% or less. After drying, the granules were sifted through a 16-mesh sieve in the same manner as mentioned above to arrange the granule size and 1 kg of original granules was obtained.

5) Seamless Encapsulating Agents Containing Eicosapentaenoic Acid (EPA)

10 kg of gelatin seamless encapsulating agent containing eicosapentaenoic acid of the composition in Example 1 of WO2009/004999 was obtained as described in this laid-open patent document.

B. Coating of Original Granules

1) Coating Method

Polyglyceryl fatty acid ester (Poem TR-FB manufactured by Riken Vitamin) was added by 2 parts by mass to 8 parts by mass of original granules prepared in 1) through 4) above, and the original granules were coated using the Triple Master TMGV-5 used when the original granules were prepared. When coating, the temperature in the container was set to near the softening point of polyglyceryl fatty acid ester (55° C.). After cooling, the original granules were sifted through a 16-mesh sieve to arrange the granule size.

2) Characteristics of Coated Granules

Thus coated granules had a moisture content of 2% or less and suppressed reactivity with other granules due to coating.

C. Mixing

Based on the combinations of coated GABA granules and vitamin C granules (Example 1), coated Korean ginseng granules and seamless encapsulating agents containing eicosapentaenoic acid (EPA) (Example 2), and coated vitamin C granules and seamless encapsulating agents containing EPA (Example 3), equivalent quantities of each were mixed using a V-shaped mixer to obtain complex granules, respectively.

Note that, for the seamless encapsulating agents containing EPA, gelatin seamless encapsulating agent containing eicosapentaenoic acid of the composition in Example 1 of WO2009/004999 was prepared by 10 kg as described in this laid-open patent document.

The coated original granules containing vitamin B were not compounded further into complex granules, but used directly as vitamin B granules (Example 4).

<Evaluation of Dispersibility>

(1) Dispersion Processing, Outflow Processing

Dispersion mediums (a) to (i) were each filled in a glass vial of 34 mm in diameter to a height of 50 mm and cooled, after which 1.7 g of the complex granules containing GABA granules and vitamin C granules in Example 1 above was introduced and the vial was shaken up and down intensely 10 times to mix the contents. The container was tilted to make the gel flow out to remove the mixture.

(2) Evaluation

Evaluation of the mixed state, as well as evaluation of the state of the remainder of the complex granules containing GABA granules and vitamin C granules in Example 1 left in the vial container after the gel was made to flow out, were performed according to the criteria specified below. The evaluation results are shown in Table 2. The mixed state was evaluated immediately after mixing, 5 minutes later, 10 minutes later and 15 minutes later, respectively. This evaluation assumed a pattern of use that the powder is dispersed immediately before being taken in the form of drinking Examples of mixed state are shown in FIG. 1.

a) Evaluation of Mixed State
 0: Not dispersed in or mixed with the solution at all
 1: Mixed with the solution, but separated and deposited
 2: Mixed with the solution and no deposits are seen
 3: Dispersed evenly in the solution b) Evaluation of State after Removal
 0: Does not come out even when the container is tilted
 1: Comes out when the container is tilted, but much remains
 2: Comes out when the container is tilted, and little remains c) Overall Evaluation The mixed-state evaluation values taken immediately after mixing, 5 minutes later, 10 minutes later, and 15 minutes later were added up with the state-after-removal evaluation values, and the total was evaluated against the following criteria to produce an overall evaluation:

X: 0 to 5 (Same as or worse than water)
Δ: 6 to 9 (Better than water, but some problems remain)
○: 10 to 14 (Very good solution to the problems)

TABLE 2

|  |  | (a) Water | (b) | (c) | (d) | (e) | (f) | (g) | (h) | (i) |
|---|---|---|---|---|---|---|---|---|---|---|
| Mixed state | Immediately after mixing | 1 | 3 | 1 | 3 | 2 | 0 | 3 | 1 | 0 |
|  | 5 minutes later | 1 | 3 | 1 | 3 | 2 | 0 | 3 | 1 | 0 |
|  | 10 minutes later | 1 | 3 | 1 | 3 | 2 | 0 | 3 | 1 | 0 |
|  | 15 minutes later | 1 | 3 | 1 | 3 | 2 | 0 | 3 | 1 | 0 |
| State after removal |  | 1 | 2 | 1 | 2 | 0 | 0 | 2 | 1 | 0 |
| Overall evaluation |  | 5 | 14 | 5 | 14 | 8 | 0 | 14 | 5 | 0 |
|  |  | x | ○ | x | ○ | Δ | x | ○ | x | x |

<Physical Property Evaluation of Dispersion Medium>

Figure 2:
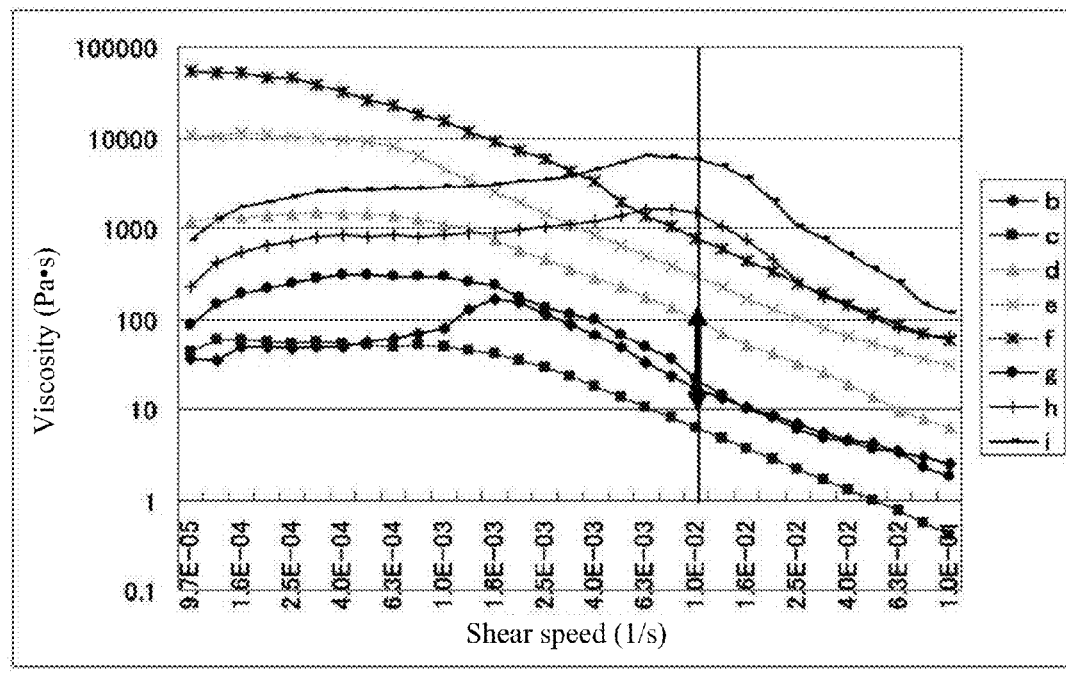
FIG. 2 is a graph showing the relationship between the shear speed and viscosity of the dispersion medium.

The dispersion mediums were tested for physical properties in terms of shear speed and viscosity. Gel was produced to a thickness of 3 mm in a plastic petri dish of 5 cm in diameter for use in the test. Excess gel running off of the edges of the plate was excluded from the target of measurement. The measured results are shown in FIG. 2.

(1) Equipment Used

Visco-elasticity measuring stress-controlled rheometer AR-G2 manufactured by TA Instruments (2) Measuring Conditions Plate used: Aluminum parallel plate of 4 cm in diameter
Gap: 2000 μm
Measurement mode: Steady-state flow viscosity measurement
Shear speed: $1.0 \times 10^{-4}$ s$^{-1}$ to $1.0 \times 10^{-1}$ s$^{-1}$ Results When the physical properties of dispersion mediums shown in Table 2 were checked by focusing on (b), (d) and (g) that had received an overall evaluation "○," it was found that those mediums contained solutions whose viscosity at a shear deformation speed of 0.01 s$^{-1}$ was 10 to 300 Pa·s. In particular, aqueous solution containing 0.025% by weight of gellan gum and aqueous solution containing 0.04% by weight of gellan gum and 0.0048% by weight of pectin are suitable.

<Granule Preservation Test and Evaluation>

The granules in Examples 1 to 3 prepared according to C of <Preparation of Granular Supplement> explained above were stored in the caps of bottles, with the bottles filled with solution b listed in Table 1, and the bottles were let stand for 2 weeks in an environment of 40° C. and humidity of 75% to observe compounding changes, changes in appearance, generation of foul smell, etc. (the present invention). Similarly, granules were prepared by simply mixing the original granules (Comparative Example 1), by coating the original granules without adjusting their moisture content (moisture content of approx. 5% by mass) (Comparative Example 2), and by mixing the granules in Examples 1 to 3 in the solution under agitation beforehand (Comparative Example 3), and were observed every day. The observed results are shown in Table 3 below.

TABLE 3

| Combination | Conforming to the present invention | Comparative Example 1 | Comparative Example 2 | Comparative Example 3 |
|---|---|---|---|---|
| GABA and vitamin C | No change | Solidified and turned brown on day 1. | Turned slightly brown and gave off foul smell. | Granules deposited with some dissolving and coloring of the solution. |
| Korean ginseng and EPA | No change | Solidified and turned brown on day 1. | Turned slightly brown and gave off foul smell. | Granules deposited with some dissolving and coloring of the solution. |
| EPA and vitamin C | No change | Turned brown on day 3. | Turned slightly brown and gave off foul smell. | Granules deposited with some dissolving and coloring of the solution. |

As shown in the results in Table 3, the granules conforming to the present invention did not undergo compounding changes, change their appearance, or give off foul smell, etc., after 2 weeks.

<Appearance and Taste Test with Granules Dispersed in Dispersion Medium>

Dispersion medium (b) explained in 2 of <Preparation of Dispersion Medium> was introduced to a height of 30 mm in a glass vial of 24 mm in diameter, after which 0.5 g of the vitamin B granules in Example 4 prepared according to C of <Preparation of Granular Supplement> above was added and the vial was shaken up and down five times to mix the two, and the mixture was evaluated for appearance and bitterness immediately after mixing, 5 minutes later, 10 minutes later, and 15 minutes later, respectively. The vial was shaken up and down twice before evaluating 5 minutes, 10 minutes, and 15 minutes after mixing.

As a comparative example, the vitamin B granules in Example 4, before being coated with polyglyceryl fatty acid ester, were used to conduct the same test.

Appearance was evaluated against the criteria specified below:

◎: Developed very little color.

○: Developed some color.

Δ: Developed color.

X: Developed deep color.

Bitterness was evaluated by five expert sensory evaluation testers against the criteria specified below. The average of evaluation results was rounded to give the evaluation value:

3: Characteristic bitterness of vitamins was absent.

2: Characteristic bitterness of vitamins was detected slightly.

1: Characteristic bitterness of vitamins was fairly noticeable.

0: Characteristic bitterness of vitamins was detected strongly.

Figure 3:
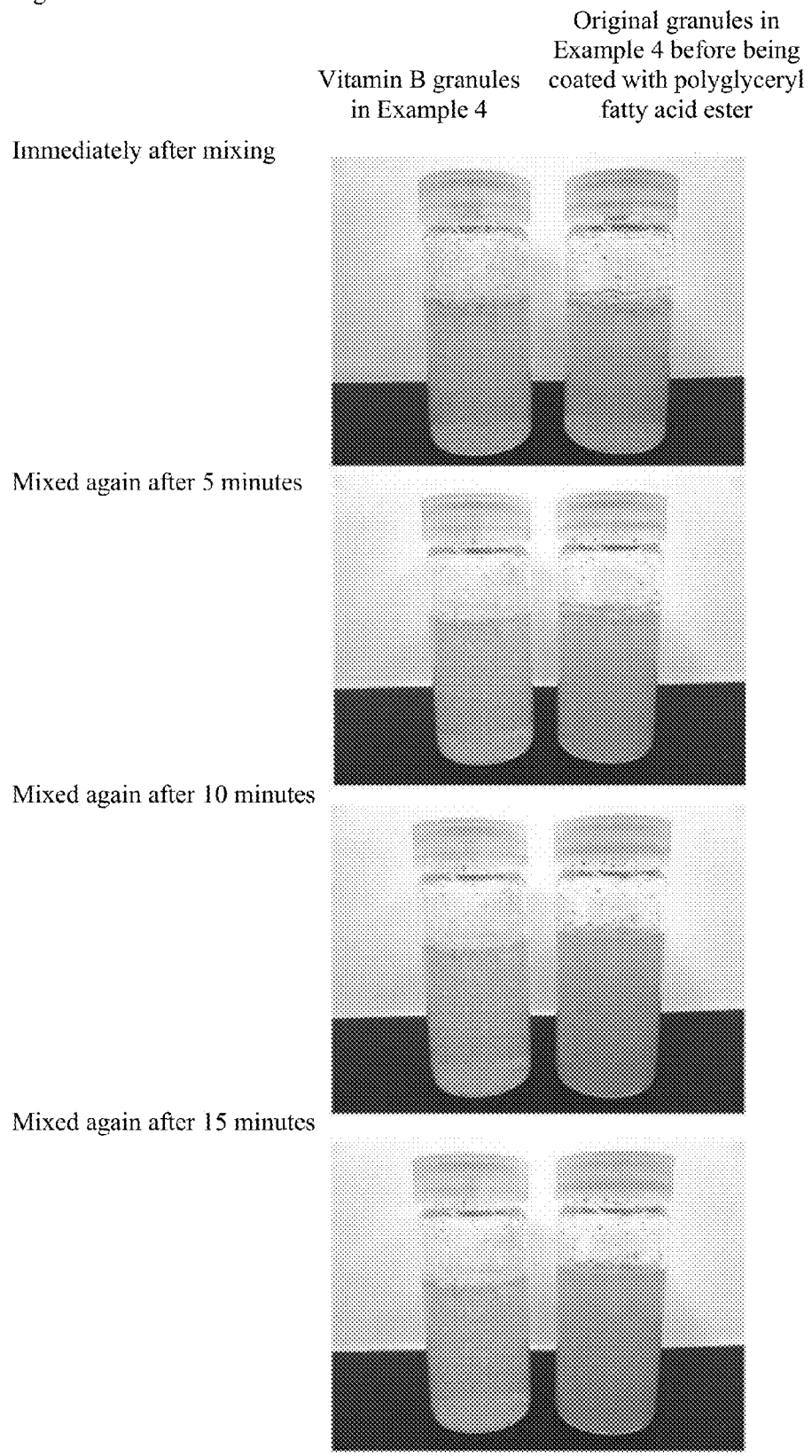
FIG. 3 is a drawing showing a comparative observation of how B vitamins coated and uncoated with polyglyceryl fatty acid ester dissolve in a drink, respectively.

The appearance evaluation results, bitterness evaluation results, and visual evaluation results are shown in Table 4, Table 5 and FIG. 3, respectively.

TABLE 4

Appearance Evaluation Results

|  | Conforming to the present invention Vitamin B granules in Example 4 | Comparative Example 4 Original granules in Example 4 before being coated with polyglyceryl fatty acid ester |
|---|---|---|
| Immediately after mixing | ◎ | Δ |
| 5 minutes later | ○ | X |
| 10 minutes later | ○ | X |
| 15 minutes later | ○ | X |

TABLE 5

Bitterness Evaluation Results

|  | Conforming to the present invention Vitamin B granules in Example 4 | Comparative Example 4 Original granules in Example 4 before being coated with polyglyceryl fatty acid ester |
|---|---|---|
| Immediately after mixing | 3 | 2 |
| 5 minutes later | 3 | 1 |
| 10 minutes later | 2 | 0 |
| 15 minutes later | 1 | 0 |

It was confirmed that coating the granules with polyglyceryl fatty acid ester would prevent the elution of the constituents of granules when they were mixed with the dispersion medium and also suppress the spreading of the flavors of constituents in the solution, thereby removing any strange taste for drinking.

TEST EXAMPLE 2

Uncoated multivitamin granules were prepared by primarily compounding the vitamins listed below, and their dispersibility was evaluated by combining with different dispersion mediums.

<Preparation of Granular Supplement>
1. Composition of Multivitamins

|  | Compounding ratio (% by weight) |
|---|---|
| VB mix (NOF) | 25.0 |
| Carotene (granules) (Kyowa Hakko Kogyo) | 10.0 |
| Vitamin C (NOF) | 55.0 |
| Vitamin D3 powder (BASF Japan) | 1.0 |
| d-α tocopherol powder (Eisai) | 9.0 |

2. Preparation of Granules
(1) Equipment Used
<Granulation>
Agitation granulation machine: High-speed mixer LFS-GS-2J (manufactured by Fukae Powtec)
<Drying>
Fluidized-bed granulation machine: Fluidized-bed granulation & coating machine MP-01 (manufactured by Powrex)
(2) Manufacturing
Materials other than carotene beads were put in the high-speed mixer and water was added by 10% of the material weight, after which the mixture was kneaded for 3 minutes at an agitator speed of 300 rpm and chopper speed of 3000 rpm.
Thereafter, the obtained kneaded mixture was dried in the fluidized-bed granulation machine at a supply air temperature of 70° C. to obtain granules. The obtained granules were mixed with carotene beads in a plastic bag to prepare multivitamin granules.
(3) Makeup of Granule Sizes
Granules having a granule size distribution of the ratios specified below were manufactured based on measurement with a sieve shaker (MICRO VIBRO SIFTER M-2 manufactured by Tsutsui Scientific Instruments).
  Granules larger than 1.00 mm: 0.3%
  Granules of 0.71 to 1.00 mm: 16.4%
  Granules of 0.50 to 0.71 mm: 21.9%
  Granules of 0.30 to 1.50 mm: 40.4%
  Granules of 0.25 to 0.30 mm: 6.6%
  Granules of 0.18 to 0.25 mm: 9.5%
  Granules of 0.15 to 0.18 mm: 2.3%
  Granules less than 0.15 mm: 2.6%
(4) Average Bulk Specific Gravity
The average bulk specific gravity of obtained multivitamin granules was 0.57.
3. Evaluation of Dispersibility
(1) Dispersion Processing, Outflow Processing
Dispersion mediums (a) to (i) were each filled in a glass vial of 24 mm in diameter to a height of 30 mm and cooled, after which 0.5 g of the aforementioned multivitamin granules was introduced and the vial was shaken up and down intensely for 10 times to mix the contents. The container was tilted to let the gel flow out to remove the mixture.
(2) Evaluation
Evaluation of the mixed state, as well as evaluation of the state of the remainder of the multivitamin granules left in the vial container after the gel was made to flow out, were performed according to the criteria specified below. The evaluation results are shown in Table 6. The mixed state was evaluated immediately after mixing, 5 minutes later, 10 minutes later, and 15 minutes later, respectively. This evaluation assumed a pattern of use that the powder is dispersed immediately before being taken in the form of drinking. Examples of mixed state are shown in FIG. 6.

<Evaluation of Mixed State>
  0: Not dispersed in or mixed with the solution at all
  1: Mixed with the solution, but separated and deposited
  2: Mixed with the solution and no deposits are seen
  3: Dispersed evenly in the solution
<Evaluation of State after Removal>
  0: Does not come out even when the container is tilted
  1: Comes out when the container is tilted, but much remains
  2: Comes out when the container is tilted, and little remains
<Overall Evaluation>
  X: 0 to 5 (Same as or worse than water)
  Δ: 6 to 9 (Better than water, but some problems remain)
  ◯: 10 to 14 (Very good solution to the problems)

TABLE 6

|  |  | (a) Water | (b) | (c) | (d) | (e) | (f) | (g) | (h) | (i) |
|---|---|---|---|---|---|---|---|---|---|---|
| Mixed state | Immediately after mixing | 1 | 3 | 1 | 3 | 0 | 0 | 3 | 2 | 0 |
|  | 5 minutes later | 1 | 3 | 1 | 3 | 0 | 0 | 3 | 2 | 0 |
|  | 10 minutes later | 1 | 3 | 1 | 3 | 0 | 0 | 3 | 2 | 0 |
|  | 15 minutes later | 1 | 3 | 1 | 3 | 0 | 0 | 3 | 2 | 0 |
| State after removal |  | 1 | 2 | 1 | 2 | 0 | 0 | 1 | 1 | 0 |
| Overall evaluation |  | 5 | 14 | 5 | 14 | 0 | 0 | 13 | 9 | 0 |
|  |  | x | ◯ | x | ◯ | x | x | ◯ | Δ | x |

The invention claimed is:

1. A bottled drink wherein granules whose surface is coated with polyglyceryl fatty acid ester are stored in a cap of a bottle at a bulk density of 0.55 to 0.75 g/mL and the bottle is filled with a solution whose viscosity as measured at a shear deformation speed of 0.01 s$^{-1}$ is 10 to 300 Pa·s and whose viscosity as a Newton fluid is 45 to 1500 Pa·s, wherein the cap has a structure capable of pushing its upper portion into its lower portion, the lowest portion of the cap is sealed, and the upper portion is equipped with a blade for opening the seal with the pushing movement, and wherein the granules are to be dropped to the solution when opening the seal by pushing the upper portion of the cap, and to be mixed with the solution and uniformly dispersed before drinking and then offered as a drink.

2. A bottled drink according to claim 1, wherein the solution is an aqueous solution containing gellan gum.

3. A bottled drink according to claim 2, wherein the moisture content of granules is 2% by mass or less.

4. A bottled drink according to claim 1, wherein the solution is an aqueous solution containing psyllium seed gum and gellan gum; pectin and gellan gum; or psyllium seed gum, pectin, and gellan gum.

5. A bottled drink according to claim 4, wherein the moisture content of granules is 2% by mass or less.

6. A bottled drink according to claim 1, wherein the moisture content of granules is 2% by mass or less.

7. A bottled drink according to claim 1, wherein the blade has a crosshair shape and is disposed at a center of the upper portion of the cap for opening a through-hole at a center of the seal.

8. A bottled drink wherein multiple types of granules containing mutually incompatible chemical agents or nutritional constituents and whose surface is coated with polyglyceryl fatty acid ester are stored in a cap of a bottle at a bulk density of 0.55 to 0.75 g/mL and the bottle is filled with a solution whose viscosity as measured at a shear deformation speed of $0.01 \text{ s}^{-1}$ is 10 to 300 Pa·s and whose viscosity as a Newton fluid is 45 to 1500 Pa·s, wherein the cap has a structure capable of pushing its upper portion into its lower portion, the lowest portion of the cap is sealed, and the upper portion is equipped with a blade for opening the seal with the pushing movement, and wherein the granules are to be dropped to the solution when opening the seal by pushing the upper portion of the cap, and to be mixed with the solution and uniformly dispersed before drinking and then offered as a drink.

9. A bottled drink according to claim 8, wherein the solution is an aqueous solution containing gellan gum.

10. A bottled drink according to claim 9, wherein the moisture content of granules is 2% by mass or less.

11. A bottled drink according to claim 8, wherein the solution is an aqueous solution containing psyllium seed gum and gellan gum; pectin and gellan gum; or psyllium seed gum, pectin, and gellan gum.

12. A bottled drink according to claim 9, wherein the moisture content of granules is 2% by mass or less.

13. A bottled drink according to claim 8, wherein the moisture content of granules is 2% by mass or less.

14. A bottled drink according to claim 8, wherein the blade has a crosshair shape and is disposed at a center of the upper portion of the cap for opening a through-hole at a center of the seal.

* * * * *